United States Patent [19]

Altenberg et al.

[11] Patent Number: 4,701,477
[45] Date of Patent: Oct. 20, 1987

[54] LOW VISCOSITY AROMATIC POLYOLS AND METHODS FOR THEIR PREPARATION

[75] Inventors: Milton J. Altenberg, San Francisco; Johannes deJong, Huntington Beach, both of Calif.

[73] Assignee: Chardonol, Division of Freeman Corporation, Port Washington, Wis.

[21] Appl. No.: 513,502

[22] Filed: Jul. 13, 1983

[51] Int. Cl.[4] ............................................ C08G 18/14
[52] U.S. Cl. .................... 521/167; 252/182; 521/48; 521/48.5; 521/172; 528/274; 528/275; 528/288; 528/297; 528/308.1; 528/308.2; 560/89; 560/91; 560/93
[58] Field of Search ............................ 560/91, 89, 93; 252/182; 521/48, 48.5, 167, 172; 528/274, 275, 288, 297, 308.1, 308.2

[56] References Cited

U.S. PATENT DOCUMENTS

| 3,153,002 | 10/1964 | Wissner et al. | 260/2.5 |
| 3,167,538 | 1/1965 | Kaiser et al. | 260/210 |
| 3,249,562 | 5/1966 | Schoepfie et al. | 260/2.5 |
| 3,297,597 | 1/1967 | Edwards et al. | 260/2.5 |
| 3,399,154 | 8/1968 | Bernstein et al. | 260/22 |
| 3,488,298 | 1/1970 | Barkey et al. | 260/2.3 |
| 3,503,904 | 3/1970 | Dietz et al. | 260/2.3 |
| 3,928,253 | 12/1975 | Thornton et al. | 260/2.3 |
| 4,048,104 | 9/1977 | Svoboda et al. | 260/2.5 |
| 4,223,068 | 9/1980 | Carlstrom et al. | 428/310 |
| 4,237,238 | 12/1980 | DeGuiseppi et al. | 521/131 |
| 4,439,549 | 3/1984 | Brennan | 521/131 |
| 4,442,237 | 4/1984 | Zimmerman et al. | 521/131 |
| 4,442,238 | 4/1984 | Zimmerman et al. | 521/164 |

Primary Examiner—Maurice J. Welsh
Attorney, Agent, or Firm—Margaret A. Boulware

[57] ABSTRACT

A method for preparing aromatic polyols useful for the production of polyurethane and polyisocyanurate polymers involves digesting scrap polyalkylene terephthalate polymers with a digesting agent, typically a low molecular weight polyol. The digestion product is then treated with an alkylene oxide to produce a low viscosity polyol which displays excellent stability over long term storage.

57 Claims, No Drawings

LOW VISCOSITY AROMATIC POLYOLS AND METHODS FOR THEIR PREPARATION

BACKGROUND OF THE INVENTION

1. Field of the Invention

The present invention relates generally to the preparation of polyurethane and polyisocyanurate polymers, and more particularly to the preparation of low viscosity aromatic polyols which can be reacted with polyisocyanates to form such polymers.

2. Description of the Prior Art

Polyurethane foams are formed by reaction between an isocyanate and a polyol having at least two hydroxyl groups. For polyisocyanurate foams, the molar ratio of isocyanate to polyol will be greater than 1 to 1, usually equal to or greater than 2 to 1. Polyurethane and polyisocyanurate foams are produced by the reaction of the isocyanate and the polyol with a suitable blowing agent, surfactant and catalyst. The degree of rigid compressive strength or flexible load deflection is determined by the functionality and molecular weight of the isocyanate and the polyol.

Aromatic polyester polyols useful for the production of polyurethane and polyisocyanurate foams can be derived from polyalkylene terephthalate polymers, such as polyethylene terephthalate (PET), by digestion of the polymer with various low molecular weight aliphatic polyols, such as polyhydric alcohols, ethers, and mixed ether-ester polyols.

The use of aromatic ester polyols obtained from polyalkylene terephthalate polymers for the preparation of polyurethanes and polyisocyanurates has a number of advantages. First, the polyalkylene terephthalate polymers can be obtained from scrap materials such as used photographic film, synthetic fibers, plastic bottles such as those used in the soft drink industry, and waste from the production of other products made from polyalkylene terephthalate polymers. A second advantage is found in the increased resiliency of flexible polyurethane foams and increased compressive strength of rigid foams prepared from such digested polyols in comparison to those prepared from other polyols. Finally, it has been found that polyurethanes and polyisocyanurates formed from such digested polyols have improved fire retardancy when compared to other conventional foams.

Despite these advantages, polyols produced by digesting polyalkylene terephthalate polymers suffer from a number of disadvantages. The digestion products are highly viscous, typically having viscosities in the range from about 20,000 cps to solid at room temperature. In order to lower the viscosity, the digested polyols are usually blended with excess amounts of a low molecular weight aliphatic polyol or reacted with isocyanates to form prepolymers. Although this lowers the overall viscosity of the combined polyols or prepolymers, the resulting mixtures are unstable and often crystallize after short term storage. In addition, the digested polyols have limited solubility in fluorocarbon blowing agents and are dimensionally unstable.

U.S. Pat. No. 4,048,104 to Svoboda et al. describes a method for utilizing polyalkylene terephthalate digestion product in the preparation of flexible polyurethane foams. Polyisocyanate prepolymers are prepared by reacting an organic polyisocyanate, e.g., toluene diisocyanate, with the digested polyol to form a prepolymer which is substantially free of unreacted hydroxyl radicals. The polyisocyanate prepolymer is then combined with additional polyol, a suitable blowing agent, a surfactant, and a catalyst in order to produce the desired flexible polyurethane.

U.S. Pat. No. 4,223,068 to Carlstrom et al. discloses the use of a similar polyol digestion product in the production of rigid polyurethane foams. In order to provide a suitable organic polyol, the polyol digestion product of a polyalkylene terephthalate is combined with a low molecular weight polyol. The amount of the digestion product present relative to the total organic polyol can be no more than 30% in order to retain the desired physical properties of the foam, particularly compressive strength and dimensional stability. While the patent to Carlstrom et al. discloses a suitable organic polyol, it suffers from the disadvantages associated with the presence of high concentrations of a low molecular weight polyol described above.

It would thus be desirable to provide an aromatic polyol derived from the digestion of polyalkylene terephthlates which is suitable for use as the sole polyol in producing polyurethane and polyisocyanurate foams.

SUMMARY OF THE INVENTION

Aromatic polyols suitable for use as the sole polyol reagent for producing polyurethane and polyisocyanurate foams are prepared by (1) digesting polyalkylene terephthalates with a low molecular weight solvent (either a polyol or polyamine), and (2) reacting the digestion product with an alkylene oxide to introduce ether functionalities onto the terminal ester linkages of the digestion product. The aromatic polyols produced by this method have low viscosities, typically being below 15,000 cps, are stable over long-term storage, and are highly soluble in fluorocarbon blowing agents.

DESCRIPTION OF THE SPECIFIC EMBODIMENTS

The polyalkylene terephthalate polymers which are the source of the aromatic polyols of the present invention may be obtained from a variety of waste materials, such as used photographic films, X-ray films, and the like; synthetic fibers and waste materials generated during their manufacture; used plastic bottles and containers such as the soft plastic beverage containers now widely used by the soft drink industry; and waste materials from the production of other products made from polyalkylene terephthalate polymers.

Polyalkylene terephthalate polymers which are suitable for the present invention will generally have the formula:

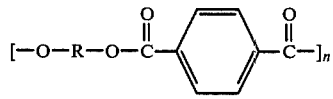

wherein R is a divalent aliphatic radical having from two to ten carbon atoms and attached to the adjacent oxygen atoms by saturated carbon atoms. Most frequently, R will be an ethylene radical to form polyethylene terephthalate or will be a butylene radical to form polybutylene terephthalate. The number of recurring units n will generally be at least 75, frequently being 500 or greater, and the molecular weight will be greater than 15,000 daltons, usually being greater than 100,000 daltons.

The low molecular weight solvent used for digesting the polyalkylene terephthalate polymers will be either a polyol, a polyamine compound containing at least two primary or secondary amine radicals, bifunctional compounds containing both hydroxyl radicals and primary or secondary amine radicals, or mixtures thereof. The functionality of the digesting solvents may be from two to eight, usually being from two to three.

Suitable polyols will typically be diols or triols. Suitable diols include ethylene glycol, propylene glycol, butylene glycol, diethylene glycol, polyethylene glycol, triethylene glycol, dipropylene glycol, butylene glycol, glycerol, polyethylene glycol, trimethylolethane, trimethyolpropane, pentaerythritol, dipentek, various alkylene glycols, various glycol ethers, and the like. Polyamine compounds useful in the practice of the present invention include hexamethylene diamine, ethylene diamine, diaminocyclohexane, 1,3-butylene diamine, phenylene diamine, and the like. Bi-functional compounds suitable for the present invention include ethanolamine, dimethanolamine, methanol-ethanol amine, diethanolamine, propanolamine, and the like.

Halogen-containing annhydrides, such as tetrachlorophthalic annhydrides, may be utilized to produce a halogen-containing digestion product. Such halogen-containing polyols are particularly desirable for manufacturing flame retardant polyurethane foams.

The alkylene oxides useful in the present invention will generally have the formula:

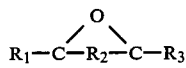

wherein:

$R_1$ and $R_3$ may be the same or different and are organic radicals having from one to six carbon atoms and from zero to two heteroatoms, or hydrogen; and $R_2$ is a divalent organic radical having from one to four carbon atoms and from zero to two heteroatoms, or a bond.

Suitable alkylene oxides include ethylene oxide, propylene oxide, butylene oxide, isobutylene oxide, N-hexyl oxide, styrene oxide, trimethylene oxide, tetrahydrofuran, epichlorohydrin, and the like. Most conveniently, ethylene oxide and propylene oxide will be employed.

Optionally, the polyol digestion product of the present invention can be reacted with an aliphatic polyol prior to alkoxylation with the alkylene oxides just described. Such reaction will further improve the compressive strength of the resulting polyurethane or polyisocyanurate product. Suitable aliphatic polyols include glycerol, trimethanol propane, trimethanol ethane, triethanol amine, tetramethylol bis-phenolate, pentaerythritol, sorbitol, annitol, and the like. A preferred reactant is methylglucoside. The aliphatic polyol should have at least three reactive hydroxyl radicals per molecule and be reacted with the polyol digestion product at an equivalent weight ratio from 0.1 to 3 based on the weight of the polyalkylene terephthalate.

As stated hereinbefore, the process of the present invention will normally be carried out with waste or scrap polyalkylene terephthalate polymers, typically polyethylene terephthalate polymers in the form of used photographic film, used soda bottles, and the like. When using such recycled materials, it will be necessary to first clean the materials to remove dirt, oil, debris, labels, and the like. In the case of photographic films, it will be necessary to remove the emulsion layer and substratum from the film prior to digestion. The emulsion layer can be removed by washing with hot water, while the substratum is typically removed with an alkylene glycol or monoethanolamine wash. Useful methods for preparing spent photographic films are described in U.S. Pat. Nos. 3,503,904 to Dietz et al. and 3,928,253 to Thornton et al., the disclosures of which are incorporated herein by reference.

After cleaning, the polyalkylene terephthalate polymers will be cut up into small pieces, typically having dimensions from ¼ to ½ inch.

The chopped polyalkylene terephthalate polymers is then placed in a reactor vessel for digestion and subsequent processing. Conveniently, the reactor vessel is an agitated pressure vessel having a refluxing column at its top for collecting the overhead vapors, condensing such vapors, and returning them to the vessel. The volume of the reactor is not critical, with commercial reactors typically being 4,000 gallons or larger.

In carrying out the digestion step, the digesting solvent is first added to the vessel and heated prior to the addition of the polyalkylene terephthalate. The reaction temperature is not critical, with temperatures above 180° C., usually between 180° to 230° C., being suitable. The digesting solvent and polyalkylene terephthalate polymer are added at about a 1:1 molar ratio. Nitrogen sparging is carried out during the digestion to remove water, while the reflux system returns the digesting solvent to the system. The digestion is typically carried out under a vacuum of from about four to five inches of mercury.

The digestion reaction is endothermic and heat must be added during the course of the reaction. The digestion takes a number of hours, frequently from 10 to 30 hours, depending on the temperature at which it is carried out. At the end of the reaction, the temperature of the digestion mixtures will rise, typically to above 200° C. over the last one to two hours. When the reaction appears to be complete, the product can be tested to see if the expected hydroxyl number is present.

The digested polyalkylene terephthalate is then reacted with from about 1.0 to 20 equivalents of the alkylene oxide for each equivalent of the polyalkylene terephthalate initially digested. For rigid polyurethane foams, the equivalent ratio of the alkylene oxide to the polyalkylene terephthalate will usually be from 1.0 to 2.0, more usually from 1.1 to 1.5. For flexible foams, the ratio will be from 5 to 20, more usually from 11 to 16.

The reaction between the alkylene oxide and the digestion product is exothermic, and the addition of the alkylene oxide should be done gradually so that the temperature in the reaction vessel does not exceed about 180° C., preferably being maintained between 160° and 165° C. The addition of the alkylene oxide forms ether linkages on the free hydroxyl groups present on the digested ester molecules. The alkoxylation reaction is typically carried out in the presence of a basic catalyst, such as an organic or inorganic base activator, such as sodium hydroxide, potassium hydroxide, sodium alkoxide, sodium methylate, preferably a tertiary amine, such as triethylamine, and the like. The catalyst is usually added in an amount between 1 to 5% of the total weight of reactants. Upon completion of the alkoxylation, the end product is vacuum stripped to remove unreacted alkylene oxides.

Prior to carrying out the alkoxylation reaction, the digestion product can be reacted with a higher functional aliphatic alcohol as described above. The reaction will be carried out at an elevated temperature, typically in the range from 160° C. to 165° C., and in the presence of the basic catalysts just described. The reaction will be carried out for approximately 2 hours, with the end point being indicated by the desired hydroxyl number. A vacuum will be maintained in order to remove excess moisture and free ethylene glycol produced during the reaction with the higher functional aliphatic alcohol. After such reaction is complete, the alkoxylation reaction is carried out in the manner described above.

The polyol prepolymers just described may be employed to produce polyurethane and polyisocyanurate foams in the conventional manner. The polyol is reacted with a suitable amount of an organic polyisocyanate in the presence of an appropriate blowing agent, catalyst and surfactant. The polyols can also be reacted with a polyisocyanate not in the presence of the catalyst, blowing agent and surfactant in order to form a prepolymer which could subsequently be cross-linked to form the polyurethane foam. Preferably, the blowing agent is either water, a halogenated blowing agent such as methylene chloride, a halogenated alkane, or combinations thereof. The surfactant is usually a silicone surfactant. The catalyst is any one of many conventional polyurethane catalysts, such as an amine or an organometallic catalyst. The ingredients are mixed together and allowed to cure, either in a mold or by free rise processes. Such processes are well known in the art and need not be further described.

The following examples are offered by way of illustration and not by way of example.

EXPERIMENTAL

Example 1

Polyethylene terephthalate (PET) film chips (500 lbs.) were charged to a 200 gallon reactor with 1 equivalent of diethylene glycol (272 lbs.). The reactor was heated for 14 hours to a temperature of 230° C. with a nitrogen sparge until the PET was completely digested by the solvent. A vacuum was pulled to remove excess moisture. The temperature was cooled to 160° C. and sodium acetate catalyst was charged. The digestion product was further sparged with nitrogen to remove additional free moisture, and 1.1 equivalent of propylene oxide (156 lbs.) was slowly added with the temperature maintained at 160° C. throughout the alkoxylation. Upon completion of the alkoxylation, the temperature was dropped to 120° C. and light fractions were stripped with a full vacuum.
Final hydroxyl number: 312
Viscosity: 2925 cps.
Acid no.: 0.1

Example 2

PET film chips (500 lbs.) were charged with 1 equivalent of diethylene glycol (148 lbs.). Ethylene oxide in the amount of 1 equivalent (112 lbs.) and 1 equivalent of propylene oxide (148 lbs.) were reacted to obtain the digestion product.
Final hydroxyl number: 275
Viscosity: 1850 cps.
Acid no.: 0.1

Example 3

As a comparison, the reaction of Example 2 was carried out without the addition of ethylene oxide or propylene oxide. The results were:
Final hydroxyl number: 375
Viscosity: Solid at room temperature
Acid no.: 2.5

According to the present invention, aromatic polyols useful as a reactant in producing polyurethane and polyisocyanurate foams can be obtained by digesting waste or scrap polyalkylene terephthalate polymers with a digestion solvent and treating the resulting digestion product with an alkylene oxide. The aromatic polyols obtained have a relatively low viscosity to facilitate handling in both free-rise and mold processing applications. Moreover, the polyols remain stable over long periods of time, display a high solubility in fluorocarbon blowing agents, and provide a foam product having high compressive strength.

Although the foregoing invention has been described in some detail by way of illustration and example for purposes of clarity and understanding, it will be obvious that certain changes and modifications may be practiced within the scope of the appended claims.

What is claimed is:

1. A method for preparing polyester-polyether polyols from polyalkylene terephthalates, which polyols are suitable for the production of polyurethanes, said method comprising:
   reacting the polyalkylene terephthalate with low molecular weight polyol or polyamine solvent at a temperature of about 180° to about 230° C. to form a polyester reaction product; and
   reacting the said reaction product with about 1 to about 20 molar equivalents, based on said polyalkylene terephthalate of an alkylene oxide containing 1 to 6 carbon atoms to introduce ether functionalities into the polyester molecules.

2. A method as in claim 1, wherein the low molecular weight solvent is a diol or triol.

3. A method as in claim 2, wherein the low molecular weight solvent is a diol.

4. A method as in claim 3, wherein the diol is selected from the group consisting of ethylene glycol, propylene glycol, dipropylene glycol, butylene glycol, diethylene glycol, polyethylene glycol and polypropylene glycol.

5. A method as in claim 1, wherein the low molecular weight solvent is a polyamine selected from the group consisting of hexamethylene diamine, ethylene diamine, diaminocyclohexane, 1,3-butylene diamine, and phenylene diamine.

6. A method as in claim 1, wherein the alkylene oxide has the formula:

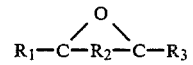

wherein:
   $R_1$ and $R_3$ may be the same or different and are organic radicals having from 1 to 6 carbon atoms and from 0 to 2 heteroatoms, or hydrogen; and
   $R_2$ is a divalent organic radical having from 1 to 4 carbon atoms and from 0 to 2 heteroatoms, or a bond.

7. A method as in claim 6, wherein the alkylene oxide is selected from the group consisting of ethylene oxide, propylene oxide, butylene oxide and isobutylene oxide.

8. A method as in claim 1, further comprising reacting an aliphatic polyol having at least three reactive hydroxyl radicals per molecule with the polyester reaction product in an equivalent weight ratio of from 0.1 to 3 based on the weight of polyalkylene terephthalate prior to the reaction of the polyester reaction product with the alkylene oxide.

9. A method as in claim 8, wherein the polyol is methyl glucoside.

10. A method as in claim 1 wherein the alkylene oxide is reacted at an equivalent weight ratio of 5 to 20 based on polyalkylene terephthalate in order to produce a product suitable for preparing a flexible polyurethane.

11. A method as in claim 1 wherein the alkylene oxide is reacted at an equivalent weight ratio of about 1 to 2 based on polyalkylene terephthalate in order to produce a product suitable for preparing a rigid polyurethane.

12. A polyester-polyether polyol suitable for the production of polyurethanes, said polyol being produced by
reacting a polyalkylene terephthalate with a low molecular weight polyol or polyamine solvent to form a polyester reaction product; and
reacting the said reaction product with about 1 to about 20 molar equivalents, based on said polyalkylene terephthalate of an alkylene oxide containing 1 to 6 carbon atoms to introduce ether functionalities into the polyester molecule.

13. A polyester-polyether polyol as in claim 12, wherein the low molecular weight solvent is a diol or triol.

14. A polyester-polyether polyol as in claim 13, wherein the low molecular weight solvent is a diol.

15. A polyester-polyether polyol as in claim 14, wherein the diol is selected from the group consisting of ethylene glycol, propylene glycol, dipropylene glycol, butylene glycol, diethylene glycol, polyethlene glycol and polypropylene glycol.

16. A polyester-polyether polyol as in claim 12, wherein the low molecular weight solvent is a polyamine selected from the group consisting of hexamethylene diamine, ethylene diamine, diaminocyclohexane, 1,3-butylene diamine, and phenylene diamine.

17. A polyester-polyether polyol as in claim 12, wherein the alkylene oxide has the formula:

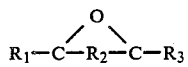

wherein:
R₁ and R₃ may have the same or different and are organic radicals having from 1 to 6 carbon atoms and from 0 to 2 heteroatoms, or hydrogen; and
R₂ is a divalent organic radical having from 1 to 4 carbon atoms and from 0 to 2 heteroatoms, or a bond.

18. A polyester-polyether polyol as in claim 17, wherein the alkylene oxide is selected from the group consisting of ethylene oxide, propylene oxide, butylene oxide and isobutylene oxide.

19. A polyester-polyether polyol as in claim 12, prepared by reacting an aliphatic polyol having at least three reactive hydroxyl radicals per molecule with the polyester reaction product in an equivalent weight ratio of 0.1 to 3 based on the weight of the polyalkylene terephthalate prior to the reaction of the polyester reaction product with the alkylene oxide.

20. A polyester-polyether polyol as in claim 19, wherein the polyol is methyl glucoside.

21. A polyester-polyether polyol as in claim 12 wherein the alkylene oxide is reacted at an equivalent weight ratio of from 5 to 20 based on the polyalkylene terephthalate in order to produce a product suitable for preparing a flexible polyurethane.

22. A polyester-polyether polyol as in claim 12 wherein the alkylene oxide is reacted at an equivalent weight ratio of from about 1 to 2 based on the polyalkylene terephthalate in order to produce a product suitable for preparing a rigid polyurethane.

23. A method for preparing a polyester-polyether polyol from a polyalkylene terephthalate, which polyol is suitable for the production of a polyurethane, said method comprising:
reacting the polyalkylene terephthalate with a bifunctional compound selected from the group consisting of ethanolamine, dimethanolamine, methanolethanolamine, diethanolamine and propanolamine at a temperature of about 180° to about 230° C. to form a polyester reacting product; and
reacting the said reaction product with about 1 to about 20 molar equivalents, based on said polyalkylene terephthalate of an alkylene oxide containing 1 to 6 carbon atoms to introduce ether functionalities into the digestion product.

24. A method for preparing a polyester-polyether polyol from a polyethylene terephthalate which comprises the steps of:
reacting said polyethylene terephthalate with diethylene glycol at a temperature of about 180° to about 230° C. to form a polyester digestion product; and
reacting the said reaction product with about 1 to about 20 molar equivalents, based on said polyethylene terephthalate, of an alkylene oxide selected from the group consisting of ethylene oxide and propylene oxide to introduce ether functionalities into the polyester molecule.

25. A method as in claim 24, wherein the alkylene oxide is present at an equivalent weight ratio of 5 to 20, based on the polyethylene terephthalate, in order to produce a product suitable for preparing a flexible polyurethane.

26. A method as in claim 24, wherein the alkylene oxide is reacted at an equivalent weight ratio of about 1 to 2 based on the polyethylene terephthalate, in order to produce a product suitable for preparing a rigid polyurethane.

27. A method for preparing a polyester-polyether polyol from a polyethylene terephthalate suitable for the production of a polyurethane, said method comprising:
reacting said polyethylene terephthalate with a bifunctional compound selected from the group consisting of ethanolamine, dimethanolamine, methanolethanolamine, diethanolamine and propanolamine at a temperature of about 180° to about 230° C. to form a polyester reaction product; and
reacting the said reaction product with about 1 to about 20 molar equivalents, based on said polyethylene terephthalate of an alkylene oxide selected from the group consisting of ethylene oxide and propylene oxide to introduce ether functionalities into the polyester molecule.

28. A method for preparing a polyester-polyether glycol from a polyethylene terephthalate, which polyol is suitable for the production of a polyurethane, said method comprising:

reacting the polyethylene terephthalate with diethylene glycol under reaction conditions including a temperature within the range of about 180° to about 230° C. and a molar ratio of diethylene glycol to polyethylene terephthalate of about 1:1 to form a polyethylene terephthalate reaction product;

reacting methyl glucoside with said polyethylene terephthalate reaction product in an equivalent weight ratio of from 0.1 to 3, based on the weight of the polyethylene terephthalate, to form an intermediate reaction product; and reacting about 1 to 20 molar equivalents, based on said polyethylene terephthalate, of an alkylene oxide selected from the group consisting of ethylene oxide and propylene oxide with said intermediate reaction product under basic conditions to introduce either functionalities into the molecules.

29. A method as in claim 28, wherein the alkylene oxide is present at an equivalent weight ratio of about 5 to 20, based on the polyethylene terephthalate, in order to produce a product suitable for preparing a flexible polyurethane.

30. A method as in claim 28, wherein the alkylene oxide is reacted at an equivalent weight ratio of about 1 to 2, based on the polyethylene terephthalate, in order to produce a product suitable for preparing a rigid foam.

31. A polyester-polyether polyol useful for the production of a polyurethane, said polyol having being produced by:

reacting the polyalkylene terephthalate with a bi-functional compound selected from the group consisting of ethanolamine, dimethanolamine, methanolethanolamine, diethanolamine and propanolamine at a temperature of about 180° to about 230° C. to form a polyester reaction product; and reacting the said reaction product with about 1 to about 20 molar equivalents, based on said polyalkylene terephthalate of an alkylene oxide containing 1 to 6 carbon atoms to introduce ether functionalities into the digestion product.

32. A polyester-polyether polyol useful for the production of polyurethanes, said polyol having been produced by:

reacting a polyethylene terephthalate with diethylene glycol at a temperature of from about 180° to about 230° C. to form a polyester digestion product; and reacting the said reaction product with about 1 to about 20 molar equivalents, based on said polyethylene terephthalate, of an alkylene oxide selected from the group consisting of ethylene oxide and propylene oxide to introduce ether functionalities into the polyester molecule.

33. A product as in claim 32, wherein the alkylene oxide is present at an equivalent weight ratio of 5 to 20, based on the polyethylene terephthalate, in order to produce a product suitable for preparing a flexible polyurethane.

34. A product as in claim 32, wherein the alkylene oxide is reacted at an equivalent weight ratio of about 1 to 2, based on the polyethylene terephthalate, in order to produce a product suitable for preparing a rigid polyurethane.

35. A polyester-polyether polyol useful for the production of a polyurethane, said polyol having been produced by:

reacting a polyethylene terephthalate with a bi-functional compound selected from the group consisting of ethanolamine, dimethanolamine, methanolethanolamine, diethanolamine and propanolamine at a temperature of about 180° to about 230° C. to form a polyester reaction product; and reacting the said reaction product with about 1 to about 20 molar equivalents, based on said polyethylene terephthalate of an alkylene oxide selected from the group consisting of ethylene oxide and propylene oxide to introduce ether functionalities into the molecule.

36. A polyester-polyether polyol useful for the production of a polyurethane, said polyol having been produced by:

reacting a polyethylene terephthalate with diethylene glycol under reaction conditions including a temperature within the range of about 180° to about 230° C. and a molar ratio of diethylene glycol to polyethylene terephthalate of about 1:1 to form a polyethylene terephthalate reaction product;

reacting methyl glucoside with said polyethylene terephthalate reaction product in an equivalent weight ratio of from 0.1 to 3, based on the weight of the polyethylene terephthalate, to form an intermediate reaction product; and reacting about 1 to 20 molar equivalents, based on said polyethylene terephthalate, of an alkylene oxide selected from the group consisting of ethylene oxide and propylene oxide and said intermediate reaction product under basic conditions to introduce ether functionalities into the molecules.

37. A product as in claim 36, wherein the alkylene oxide is present at an equivalent weight ratio of about 5 to 20, based on the polyethylene terephthalate, in order to produce a product suitable for preparing a flexible polyurethane.

38. A product as in claim 36, wherein the alkylene oxide is reacted at an equivalent weight ratio of about 1 to 2, based on the polyethylene terephthalate, in order to produce a product suitable for preparing a rigid polyurethane.

39. A mixture of aromatic polyols having hydroxyl and ester functionalities for use in preparing rigid foams, being produced by the process comprising a. reacting recycled polyethylene terephthalate with an alkylene glycol to form a reaction product and b. subsequently reacting the reaction product of step a. with an alkylene oxide in the presence of a catalyst.

40. The mixture of claim 39 in which the alkylene glycol has the formula

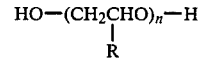

where R is hydrogen or lower alkyl of 1 to 4 carbon atoms and n is from 1 to 3.

41. The mixture of claim 39 in which the alkylene glycol is selected from the group consisting of ethylene, glycol, diethylene glycol, propylene glycol, dipropylene glycol and mixtures thereof.

42. The mixture of claim 39 in which the step b. reaction is conducted at a temperature in the range of 90° to 160° C.

43. The mixture of claim 39 in which the alkylene oxide is selected from the group consisting of ethylene oxide, propylene oxide, 1,2-butylene oxide and mixtures thereof.

44. The mixture of claim 39 in which the alkylene oxide is propylene oxide.

45. The mixture of claim 39 in which the catalyst in step b. is selected from the group consisting of basic catalysts in turn selected from the group consisting of sodium hydroxide, potassium hydroxide and amine catalysts.

46. A mixture of claim 39 in which the average hydroxyl number of the resultant mixture is between 100 and 500.

47. A rigid polyurethane foam obtained by reacting in the presence of a blowing agent and a catalyst of polyurethane formation an organic polyisocyanate and a polyol comprising the mixture of aromatic polyols of claim 39.

48. A rigid polyisocyanurate foam obtained by reacting in the presence of a blowing agent and trimerization catalyst of polyisocyanurate formation, an organic polyisocyanate and the mixture of aromatic polyols of claim 39.

49. A mixture of aromatic polyols having hydroxyl and ester functionalities for use in preparing rigid foams, being produced by the process comprising
   a. reacting recycled polyethylene terephthalate with an alkylene glycol selected from the group consisting of ethylene glycol, diethylene glycol, propylene glycol and dipropylene glycol and mixtures thereof, to form a reaction product and
   b. subsequently reacting the reaction product of step a. with propylene oxide in the presence of a catalyst.

50. A process for the production of aromatic polyols having hydroxyl and ester functionalities for use in preparing rigid foams, comprising
   a. reacting recycled polyethylene terephthalate with an alkylene glycol to form a reaction product and
   b. subsequently reacting the reaction product of step a. with an alkylene oxide in the presence of a catalyst.

51. The process of claim 50 in which the alkylene glycol has the formula

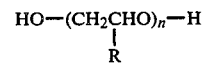

where R is hydrogen or lower alkyl of 1 to 4 carbon atoms and n is from 1 to 3.

52. The process of claim 50 in which the alkylene glycol is selected from the group consisting of ethylene glycol, diethylene glycol, propylene glycol, dipropylene glycol and mixtures thereof.

53. The process of claim 50 in which the step b. reaction is conducted at a temperature in the range of 90° to 160° C.

54. The process of claim 50 in which the alkylene oxide is selected from the group consisting of ethylene oxide, propylene oxide and 1,2-butylene oxide.

55. The process of claim 50 in which the alkylene oxide is propylene oxide.

56. The process of claim 50 in which the catalyst in step b. is selected from the group consisting of basic catalysts in turn selected from the group consisting of sodium hydroxide, potassium hydroxide and amine catalysts.

57. The process of claim 50 in which the average hydroxyl number of the resultant mixture is between 100 and 500.

* * * * *